3,838,040
HYDROCRACKING WITH ZEOLITE IN A SILICA-MAGNESIA MATRIX

John W. Ward, 19002 Gordon Lane,
Yorba Linda, Calif. 92686

No Drawing. Continuation-in-part of abandoned application Ser. No. 191,123, Oct. 20, 1971. This application Dec. 17, 1971, Ser. No. 209,439

Int. Cl. C10g 13/02

U.S. Cl. 208—111  10 Claims

ABSTRACT OF THE DISCLOSURE

Hydrocarbon conversion catalysts having improved physical characteristics as well as increased activity and selectivity containing crystalline zeolitic aluminosilicates and silica-magnesia are prepared by calcining intimate admixtures of the hydrogen precursor-stabilized hydrogen form of the zeolite and silica-magnesia at a temperature of at least about 600° F. sufficient to convert the hydrogen precursor to hydrogen ion. Compositions having particularly attractive hydrocarbon conversion properties contain alumina in addition to the zeolite and silica-magnesia.

---

This application is a continuation-in-part of my copending application Ser. No. 191,123, filed Oct. 20, 1971, and now abandoned.

BACKGROUND

Zeolite containing compositions are known to exhibit several properties which make them particularly attractive for the conversion of hydrocarbons to more valuable products.

One area of particular interest is that of hydrogenative hydrocarbon conversion. The reaction mechanisms involved in these systems are primarily hydrogenation and hydrocracking. Such methods have found extensive use for the conversion of aromatic or olefinic hydrocarbons to saturated derivatives and the conversion of relatively high boiling mineral oils to lower boiling products.

All of these hydrocracking processes, particularly those employed to convert higher boiling distillates to either gasoline or midbarrel fuels, involve economic factors which are dependent upon catalyst characteristics. For example, in essentially every gasoline or midbarrel hydrocracking process it is desirable to convert the feed to products boiling below a certain predetermined boiling point. However, in every case a substantial amount of a feed will be converted to products boiling below the desired product range. The production of midbarrel fuels usually involves the conversion of feeds boiling primarily above 700° F. to products boiling within the range of about 300–700° F. However, substantial amounts of conversion to products boiling below 300° F. always results. The production of such lower boiling materials is not usually desired. Their recovery and economic utility may or may not be possible depending upon their suitability for gasoline blending stocks or other applications. As a result, it is important that the catalyst employed to effect these conversions exhibit the highest possible selectivity to the desired product so as to avoid excessive conversions to less valuable products. The same considerations are relevant in the production of gasoline range hydrocarbons.

It is therefore one object of this invention to provide an improved hydrocarbon conversion catalyst. It is another object to provide an improved hydrocracking catalyst. In accordance with another objective there is provided an improved hydrocracking catalyst of increased activity and selectivity. Yet another object is the provision of a method for producing such hydrocarbon conversion catalysts. Another objective is a provision of an improved hydrocarbon conversion process. Another objective involves the provision of a hydrocracking process exhibiting higher selectivity to gasoline and/or midbarrel fuels.

Other objects and aspects of this invention will be apparent from the following disclosure and the appended claims.

In accordance with one embodiment a highly active and selective hydrocarbon conversion catalyst contains a catalytically active amount of a combination of a crystalline zeolitic aluminosilicate and silica-magnesia produced by the method including the steps of calcining an intimate admixture of the hydrogen precursor-hydrogen form of the aluminosilicate and silica-magnesia under conditions sufficient to convert the hydrogen precursor portion of the aluminosilicate to the corresponding hydrogen form.

In another embodiment, hydrocarbons are hydrogenatively converted upon reaction with hydrogen at elevated temperatures and pressures in the presence of the noted compositions. Compositions particularly preferred for this purpose also include catalytically active amounts of one or more hydrogenation active metals or metal compounds, e.g., oxides and sulfides.

In accordance with another embodiment a zeolite-silica-magnesia combination is prepared from available materials by a specific sequence of steps. First a zeolitic aluminosilicate having at least 20% of its ion exchange capacity occupied by hydrogen ions or hydrogen ion precursors is calcined at a temperature of at least about 650° F. in the presence of at least about 0.5 p.s.i. water vapor pressure during at least the initial stage of thermal treatment. This material is then reexchanged with hydrogen ion or hydrogen precursors to a degree sufficient to occupy a substantial part of the residual ion exchange capacity of the zeolite with hydrogen ions or precursors and reduce the exchangeable alkali metal content of the zeolite to less than about 2 weight-percent determined as the corresponding alkali metal oxide. The resultant hydrogen precursor-stabilized hydrogen zeolite is then admixed with silica-magnesia in the presence or absence of other refractory inorganic oxides and calcined at a temperature of at least about 600° F. sufficient to thermally activate the aluminosilicate and convert the hydrogen ion precursors, when present, to hydrogen ion. The use of hydrogen precursors rather than hydrogen ions is presently particularly preferred in the second exchange step. The temperatures at which these compositions are activated should of course not be severe as to excessively diminish zeolite crystallinity.

I have discovered that these compositions demonstrate considerably higher activity, ion exchange capacity and higher stability to ammonia than is exhibited by compositions prepared by thermally treating the reexchanged zeolite before admixture with the refractory oxide.

Whether or not these effects are associated with an interaction of the unstabilized portion of a zeolite with the silica-magnesia and/or other refractory oxide when present, or an interaction of the zeolite decomposition products with the oxide or with itself, or are associated with some other variable has not been explained. Nevertheless, the properties of these materials can be due only to some characteristics of that composition. Accordingly, it must be concluded that the observed effects derive at least in part from the interaction of the zeolite and silica-magnesia and that these compositions distinguish in some significant respects from previously available materials.

The aluminosilicates employed within the concept of this invention must be crystalline zeolitic aluminosilicates having ion exchange capacities sufficient to enable the incorporation of substantial amounts of hydrogen ion or hydrogen ion precursors by ion exchange. In addition, they must have sufficient structural stability to withstand the calcination temperature employed to convert the unstabilized form to the corresponding stabilized hydrogen form in the first steaming step. A number of natural and synthetic materials are known to meet these requirements.

Zeolites which are presently most preferred comprise zeolites Y, T, L and Omega. This preference is due primarily to their chemical and physical properties such as pore size, pore volume, surface area, ion exchange capacity and catalytic activity. Zeolites preferred for the preparation of hydrocarbon conversion catalysts in accordance with this invention have original structural silica-to-alumina ratios of at least about 3. These materials also preferably have ion exchange capacities of at least about 3 meq. of sodium per gram of zeolite. The ion exchange capacity of both the naturally occurring and synthetic zeolites is usually originally occupied by alkali metal ions, particularly sodium and potassium ions.

When the compositions of this invention are to be produced from a naturally occurring aluminosilicate or a synthetic zeolite the starting material is preferably first exchanged with hydrogen ions or hydrogen ion precursors in an amount sufficient to occupy at least 20 percent of the ion exchange capacity of the zeolite. A corresponding amount of the alkali metal originally present in the zeolite is replaced by the hydrogen ion precursors or hydrogen ions introduced by direct exchange. However, it is presently preferred that this first exchange step be sufficient to reduce the alkali metal content of the aluminosilicate to less than 3 percent and preferably less than 2 percent alkali metal. This procedure is usually sufficient to introduce at least about 0.5 milliequivalents of hydrogen ions or hydrogen ion precursors per gram of zeolite.

Hydrogen ion precursors are generally well known and include ions which are exchangeable into aluminosilicates and decompose upon exposure to elevated temperatures to form the hydrogen ion form of the aluminosilicate. Illustrative of these materials are the organic and inorganic ammonium salts such as ammonium halides, e.g., chlorides, bromides, ammonium carbonates, ammonium thiocynate, ammonium hydroxide, ammonium molybdate, ammonium dithionate, ammonium nitrate, ammonium sulfate, ammonium formate, ammonium lactate, ammonium tartrate and the like.

In the alternative the hydrogen ion can be introduced directly in the first exchange step by contacting the aluminosilicate with a hydrogen ion donor such as an organic or inorganic acid. Hydrogen ions introduced in this manner are herein referred to as unstabilized hydrogen ions since they have not yet been subjected to stabilizing thermal treatment. Illustrative inorganic acids include hydrochloric, sulfuric, nitric, etc. However, it is presently preferred that the hydrogen ion be introduced by ion exchange with an inorganic ammonium salt such as ammonium nitrate or ammonium sulfate followed by steaming in the presence of water vapor at a temperature of at least about 600° F.

I have found that in order to produce a composition having the desired ultimate properties it is essential that the zeolite be steamed following the first exchange, as opposed to calcination under anhydrous conditions. It is believed that maintaining at least a measurable amount of water vapor in the vicinity of the zeolite during this first thermal treatment is necessary to preserve a higher degree of the structural integrity while maintaining ion exchange capacity, catalytic acidity, increasing pore size distribution and improving selectivity to midbarrel fuels under hydrocracking conditions. Accordingly, this thermal treatment is usually conducted in the presence of at least about 0.5 and preferably about 2 to about 15 p.s.i. water vapor partial pressure.

This objective can be realized by any procedures capable of maintaining a substantial amount of water vapor in the presence of the zeolite during at least the initial stages of the thermal treatment. For example, the exchanged zeolite can be introduced into a batch or continuous rotary furance, a moving bed furance or static bed calcination zone into which humified air, or more preferably saturated air, is introduced either cocurrently or countercurrently. In the alternative, provision can be made to trap water vapor released by the zeolite during the initial stages of calcination.

Steaming should be effected at a temperature sufficient to thermally stabilize and/or convert the zeolite to the corresponding hydrogen or decationized form yet insufficient to thermally degrade a substantial portion of the aluminosilicate structure. Steaming temperatures are usually in excess of 600° F., preferably about 800 to about 1650° F. The zeolite is subjected to these temperatures for a period sufficient to convert the zeolite to the desired stabilized hydrogen or decationized form. The duration of this treatment is usually at least about 0.5 minutes, preferably about 10 minutes to about 4 hours at temperature. Zeolites thus treated are herein referred to as the stabilized hydrogen form of the zeolite. Sometimes only a portion of the remaining exchange capacity will be occupied by stabilized hydrogen ions. In those instances the remainder of the ion exchange capacity may be occupied by ions of another nature.

The resultant steamed zeolite is then reexchanged with a hydrogen ion precursor under conditions sufficient to reduce the alkali metal content to less than 2 percent, usually less than one percent and preferably less than 0.6 weight-percent determined as the corresponding alkali metal oxide. These conditions are usually sufficient to produce a zeolite containing an amount of hydrogen precursor ion corresponding to at least about 5 relative percent of the original ion exchange capacity of the aluminosilicate.

The zeolite, preferably having this composition, is then intimately admixed with silica-magnesia prior to thermal activation. Additional refractory oxides may be added at this or other stages if desired. Exemplary refractory oxides are alumina, berylia, zirconia, titania, thoria. chromia, and the like, combinations thereof such as silica-alumina silica-zirconia, silica-alumina-berylia, naturally alumina, silica-zirconia, silica-alumina-berylia, naturally occurring clays containing such refractory oxides, etc. When naturally occurring clays are combined with these compositions it is preferred that they be acid extracted prior to admixture with the zeolite and/or silica-magnesia. Such acid extraction is generally known and is employed to remove acid soluble impurities.

The zeolite-silica-magnesia admixture usually contains at least about 0.5 weight-percent zeolite, preferably at least about 2 weight-percent and generally about 2 to about 90 weight-percent zeolite based on the combined dry weight of the aluminosilicate and the silica-magnesia. These combinations can be prepared in any one of numerous ways. For example, the silica-magnesia can be combined with the aluminosilicate either as a hydrous sol or gel or as an anhydrous or thermally activated gel. Similarly, a hydrous silica sol, with or without magnesia, or a solution of a silica precursor such as an alkali metal silicate or silicic acid, can be precipitated by well known methods to form a gel in the presence of the aluminosilicate. In another embodiment, magnesia can be precipitated from an aqueous solution of a water soluble magnesium salt upon the addition of base such as ammonia, ammonium hydroxide or the like to form a finely dispersed magnesia phase in the presence of the dispersed aluminosilicate particles. This material can then be combined directly with a silica source such as by precipitation of silica from an alkali or alkaline earth metal silicate solution. In the alternative the combination of zeolite and magnesia can first be dried and/or calcined and the resulting combinations subsequently combined with silica either by precipitation of silica from an aqueous solution as described above or by comulling with a reactive silica source as hereinafter detailed. One of the more convenient procedures by which these aluminosilicates can be combined with silica-magnesia involves physical admixture of either the relatively dry forms of the aluminosilicate and silica-magnesia or by dispersion of the two constituents in an aqueous phase.

Methods of preparing silica-magnesia that can be employed in this procedure are generally well known in the art. One such method involves in the preparation of silica hydrogels by precipitating silica from an aqueous solution of a silicate salt such as alkali or alkaline earth metal silicate or silicic acid by reducing the solution pH. Precipitation of this nature can be effected by the addition of inorganic acids such as hydrochloric, nitric, sulfuric and the like. The resultant silica hydrogel is then preferably washed and soaked in a solution of a magnesium salt in proportions sufficient to provide the desired relative amounts of magnesia and silica in the ultimate composition. Illustrative of water soluble magnesium compounds suitable for this purpose are the chloride, nitrate, sulphate, acetate, bromide, iodide, bromate, chlorate, chromate, citrate, and the like. Magnesia is then precipitated in situ by increasing the solution pH by adding base. Suitable bases include ammonia, ammonium hydroxide, sodium hydroxide, and the like.

The resultant hydrogel is then water-washed free of soluble salts. This material can then be combined directly with the aluminosilicate by dispersion in aqueous phase and admixture with the finely dispersed aluminosilicate as such. In the alternative, the hydrogel can first be dried and thermally activated by heating at a temperature of above about 600° F. and then combined with the aluminosilicate by any of the well known methods of mechanical admixture.

The silica-magnesia combination can also be formed by simply comulling magnesium oxide with a dried silica hydrogel. However, more effective interaction of the silica and magnesia is obtained if the mulling of these two constituents is effected in the presence of sufficient water to form a coherent paste. The ratio of water to solids in these systems is usually about 5 to about 12 parts by weight water per part of solids. This material can then be dried and thermally activated.

The relative amounts of silica and magnesia can vary considerably with most compositions containing at least about 5 weight-percent magnesia based on the combined weight of silica and magnesia.

A composition particularly useful for the hydrocracking conversion of hydrocarbons to gasoline or midbarrel range products includes a minor amount of alumina. The alumina content is usually at least about 2 and preferably about 5 to about 30 weight-percent based on the combined dry weight of alumina, aluminosilicate and silica-magnesia. I have found that at these levels physical properties such as crushing strength are improved without intolerable loss of activity or other desirable properties.

The additional refractory oxide can be combined with the aluminosilicate at essentially any point in the procedure. However, it is presently preferred that it be incorporated either with the silica-magnesia or after the combination of aluminosilicate and silica-magnesia is formed.

The improved properties of these materials, as already observed, is believed to be due to some interaction between the described zeolites and the inorganic oxide or oxides. Other components which do not essentially negate this effect can obviously be included. Such components can either be neutral or can be adjuvants for activity, stability or other properties. As already mentioned it is sometimes desirable to incorporate active metals, ions or compounds at one or more stages of the preparation procedure. Other materials include the halides, especially fluorides and chlorides, phosphorus, etc. The halides may be introduced as the salt by impregnation or by treatment of either the zeolite, silica-magnesia or other oxide with the corresponding acid. Phosphorus may be present as the phosphate and can be incorporated as an acid, e.g., orthophosphoric acid, a water soluble salt, or the like.

The resultant combination is then thermally activated under conditions sufficient to convert the hydrogen precursor ions in the aluminosilicate to hydrogen ion. It is also believed that some interaction between the silica-magnesia and/or additional refractory oxide and zeolite takes place during this thermal activation. However, the occurrence of or exact nature of this interaction has not yet been ascertained. Such interaction might explain at least in part the superior characteristics exhibited by these compositions.

As already mentioned, somewhat improved properties are obtained if this calcination is performed under substantially anhydrous conditions. However, in an alternative embodiment the zeolite-silica-magnesia combination can be further modified at this point when it is desired to produce an ultimate composition containing either stabilizing or catalytically active metals, metal ions or oxides. In accordance with this embodiment the metal, metal ion or compound can be combined with the zeolite either before or after admixture with the silica-magnesia or prior to the first or second exchange or calcination steps. These metals, compounds or ions have been discussed in detail by previous investigators as have methods of combining them with zeolites or combinations of zeolites and refractory oxides. They are usually selected from periodic Groups IB, II, IV, V, VI, VII and VIII in addition to the actinide and lanthanide series. Particularly active hydrocarbon conversion catalysts can be produced by incorporating certain Group VI metals or compounds thereof, particularly compounds of molybdenum and tungsten, or the iron group metals, particularly nickel and cobalt.

The metals, compounds or ions can be added either to the zeolite, the silica-magnesia, to the refractory oxide, or to the admixed combination of any of those components.

Numerous methods of combining metals, metal compounds or metal ions with zeolites and/or refractory oxides have been discussed by previous investigators and accordingly are not treated comprehensively herein. Exemplary procedures include ion exchange of the metal ion into the zeolite. This procedure is particularly attractive when the active metal component is selected from the rare earths or periodic Group IB, II, IV, V, VII or VIII. It is presently preferred for the incorporation of polyvalent metal cations such as magnesium, manganese, nickel, cobalt, zinc, cadmium, aluminum, chomium, iron, and the lanthanide and actinide elements. In the alternative, the active metals can be added as such or in the form of a compound by either comulling or coprecipitation with the zeolite, silica-magnesia, refractory oxide or any combination thereof, or by impregnation of either or all of these constituents before or after admixture with either an aqueous solution of a water soluble metal compound or an organic solution of a metal compound soluble in the organic phase.

The equivalent metal concentrations will vary considerably as has been indicated in other publications depending upon the metal or metal compound employed and the properties desired in the ultimate composition. The iron group metals, notably nickel and cobalt, are usually incorporated in amounts of up to about 15 percent, usually about 0.5 to about 10 percent determined as the corresponding oxide. Higher concentrations of the Group VI metals can be employed and usually correspond to about 2 to about 40 weight-percent of the corresponding metal oxide based on the combined dry weight of the zeolite and silica-magnesia.

The combination of zeolite and silica-magnesia either with or without added metal components is then subjected to a calcination step. This procedure involves subjecting the composition to a temperature of at least about 600° F. and preferably at least about 800° F., usually about 800° to about 1500° F. The avoidance of high water partial pressures during this thermal activation is not necessary but is presently preferred. Accordingly, this thermal treatment is preferably conducted in the presence of flowing air containing less than about 3 and preferably less than about 1 p.s.i. water vapor partial pressure. However, these conditions relate only to the total environment and are not intended to characterize the vapor phase existing within the composition.

The calcined combination can be further modified at this stage to improve catalytic activity by the incorporation of catalytically active components such as those previously discussed. As a result it is possible to incorporate either stabilizing or catalytically active components or both either before or after the last mentioned calcination step or to add one or more of those constituents to the zeolite-silica-magnesia combination both before and after calcination. The amounts of materials thus added after calcination and the manner in which they are incorporated with the calcined material include all of those previously mentioned which are compatible with the physical form of the product such as impregnation, ion exchange, comulling, and the like. However, at least one characteristic of these compositions renders the use of certain impregnation or exchange procedures more attractive than was the case with the previously available compositions. This matter involves the markedly improved stability of these compositions to basic environments such as ammoniacal solutions or ammonia atmospheres, particularly when the resultant composition is to be subsequently exposed to elevated temperatures. As a result of this quality it is possible to contact the zeolite-refractory oxide combination with either ammoniacal solutions of active components or active component precursors or ammonia atmospheres as might exist during impregnation, ion exchange or regeneration.

Moreover, the ability of these combinations to withstand acidic environments makes it possible to expose them to low pH environments during impregnation, ion exchange, and extraction and the like. Such treatments can involve exposure of the finished composition to pH levels below 2 and even below 1 for limited periods with much less diminution of crystallinity or related properties.

For the purposes of this invention hydrocracking systems involve the conversion of at least 20 volume-percent of the hydrocarbon feed to materials boiling below the initial boiling point of the feedstock. In most commercial applications it is generally preferred to effect the conversion of at least 40 volume-percent of the feed to materials boiling below the initial feed boiling point.

At times, the hydrocracking systems cannot be so characterized due to the inclusion of minor amounts of relatively low boiling materials in the original feedstock. In those situations, hydrocracking is more readily distinguished from less severe hydrogenative conversions by characterizing the number of moles of product produced relative to the amount of feedstock reacted. On that basis these methods involve the production of at least 110 moles of product for each 100 moles of hydrocarbon feed reacted. However, higher conversions involving the production of at least 120 moles of product for each 100 moles of feed are generally preferred. These reactions can be even further characterized by relatively higher net hydrogen consumption which usually exceeds about 250 standard cubic feet net hydrogen consumed per barrel of hydrocarbon feed.

As illustrated by the examples hereinafter detailed, the compositions and methods of this invention are particularly attractive for the conversion of higher boiling hydrocarbon feeds to midbarrel range products. The activity of these compositions is dramatically superior to that of analogous compositions containing refractory oxides other than silica-magnesia. Moreover, the selectivity of these catalysts for the desired midbarrel products, i.e., their ability to maximize feed conversion to the desired products, is vastly superior to analogous compositions containing other refractory oxides when compared on a comparable activity basis.

Considerable overlap can and does exist between the definitions of midbarrel range fuels, gasoline range hydrocarbons and lower boiling products. At least part of this overlap depends on the selection of product cut points for convenience of identification. A much more significant variable however is the difference in product properties required to meet specific end uses, and/or the tailoring of hydrockate product required to obtain the optimum performance of post treatment systems such as reforming and isomerization. However, as a general rule midbarrel products, a category which includes diesel fuels, turbine fuels and furnace oils, are usually characterized by a boiling point range of about 300 to about 700° F. The lower boiling material within this range, i.e., those boiling between 300 and about 570° F. usually include the diesel and turbine fuel fractions. The remaining higher boiling hydrocarbons are generally characterized as furnace oil fractions. On the other hand, products encompassed in a $C_5$ to 300° F. fraction are generally defined as gasoline boiling range products. However it is often the case that the gasoline fraction will be defined to encompass products boiling up to about 400° F. when the presence of these higher boiling constituents in either the gasoline products or in post-treatment systems is desirable.

Regardless of the exact definition given to the product fraction, any attempt to convert higher boiling feeds to any of these products, involves conversion of a substantial proportion of the feed to products boiling below the desired product range. Accordingly, the amount of feed cracked to lower boiling materials, is converted to less desired products, and the economic return on the system is correspondingly reduced. If the amount of such conversion can be reduced while maintaining the same rate of conversion to the desired product boiling range, the economics of the system are obviously improved. It is this balance of overall conversion versus conversion to the desired product, that is referred to as selectivity. It is therefore significant that the aluminosilicate-silica-magnesia compositions herein described exhibit a greater degree of selectivity to a specified product boiling range than do analogous compositions not containing silica-magnesia. In other words these catalysts operate in such a manner that a greater proportion of the feed is converted, for example, to products boiling between 300 and 700° F. The conversion to products boiling outside this range is correspondingly reduced.

Several compositions have characteristics which are particularly suitable for hydrogenative conversions. The primary difference involves the presence or absence of hydrogenation components and the nature of those components. It is presently preferred that the compositions employed for hydrogenative conversions contain at least a catalytically active amount of at least one metal, ion, oxide or sulfide of periodic Groups VI and VIII. Particularly attractive midbarrel cracking catalysts include the metals, oxides and sulfides of molybdenum, cobalt, tungsten and/or nickel.

The concentration of aromatic constituents in the feed can vary considerably from only nominal amounts to 100%. However, as a general rule, the materials having carbon-to-carbon unsaturation will constitute at least about 5 volume percent and usually in excess of about 10 volume percent of the hydrocarbon feed. Materials having the most comomn application in these methods boil primarily above about 40° F. However, in most applications, the principal part of the feedstock will boil in excess of about 100° F., usually in the range of about 200 to about 1300° F.

The relevant variables in these systems including catalyst composition, total pressure, temperature, hydrogen partial pressure and contact times are controlled so as to promote a substantial increase in hydrogen-to-carbon ratio of the hydrocarbon feed. As a general rule it is desirable to increase the hydrogen-to-carbon ratio of the unsaturated materials in the hydrocarbon feed by a factor of at least about 5 relative percent on a molar basis. In other words, the ratio of hydrogen-to-carbon contained in the unsaturated feed constituents will be increased by at least about 5%. This increase usually corresponds to a reduction in the concentration of unsaturated components of at least about 5%, preferably at least about 10% on a relative basis. For example, a reduction in unsaturates level of 10 relative percent for a feed originally containing about 50 volume percent unsaturated components would correspond to the production of a product fraction containing about 45 volume percent unsaturates. Much higher conversion levels will often be desirable. However, the advantages of this invention are apparent at lower conversions as well.

As a general rule, hydrocracking temperatures will be in excess of about 400° F., usually within the range of 400 to about 950° F. Total reaction pressures are generally in excess of 500 p.s.i.g., usually about 500 to about 5000 p.s.i.g. Superatmospheric hydrogen partial pressures are always employed. In conventional terms the hydrogen concentrations are usually equivalent to at least about 50 standard cubic feet per barrel, generally in excess of 100 and usually about 400 to about 20,000 standard cubic feet per barrel.

The following examples are presented to illustrate the principles involved in and the implementation of the several concepts of this invention. Numerous variations and modifications of these concepts, including those already discussed, are made apparent by these demonstrations. Accordingly, the examples are intended only to be illustrative and obviously do not limit the scope of application of the principles involved in these discoveries.

EXAMPLE 1

This example demonstrates the preparation of one species of the catalyst of this invention. A 1000 gram portion of sodium Y zeolite having a loss on ignition of about 50 weight-percent was ammonium exchanged by immersing the zeolite in an exchange solution. This medium was prepared by the addition of 500 grams of ammonium sulfate to 2000 milliliters of water. The exchange was conducted under agitation for one hour at about 200° F. The resultant suspension was filtered to recover the partially exchanged zeolite which was then immersed in a similar ammonium sulfate solution and exchanged under agitation for an additional 2 hours at about 200° F. The zeolite was recovered by filtration and water washed until free of sulfates. A portion of the resultant zeolite was then steamed in a preheated furnace at 800° C. for one hour. The steam atmosphere was maintained by covering the zeolite container during at least the initial part of the heating period. The thus steamed zeolite was then reexchanged twice with excess ammonium sulfate, water washed and dried at 110° F.

This material was then combined with silica-magnesia and alumina gels in proportions corresponding to 5 weight-percent zeolite, 15 weight-percent aluminum and 80 weight-percent silica-magnesia on a dry weight basis. The silica-magnesia contained about 3 weight-percent fluorine and is commercially available as SM-30 from the Davison Chemical Division of W. R. Grace & Company, New York, N.Y. Sufficient water was added to this mixture to produce a extrudable paste which was then extruded into pellets and calcined at 900° F. for 2 hours. The extrudates were then impregnated by immersion in a solution of nickel nitrate hexahydrate and ammonium tungstate in proportions sufficient to produce a catalyst containing 5.8 weight-percent NiO and 18.1 weight-percent $WO_3$. The product was calcined for one hour at 900° F. and sulfided.

EXAMPLE 2

The activity of the composition of Example 1 for hydrocracking conversion was evaluated on a gas oil feed boiling between 580 and 990° F. and containing 0.082 percent nitrogen and 2.91 percent sulfur. Reaction conditions included a pressure of 2,000 p.s.i.g., a liquid hourly space velocity of 1.5 and a hydrogen addition rate of 10,000 standard cubic feet per barrel of hydrocarbon. The reaction temperature required to effect 50% conversion of the feed to products boiling below 570° F. was determined. A temperature of 728° F. was required to obtain this objective. The conversion rate to 570° minus product was doubled by increasing the temperature 22° F. to 750° F. The efficiency of conversion to turbine fuel products boiling between 300° and 570° F. was also determined and equaled 71.2% of the converted product.

EXAMPLE 3

The operation of Example 2 was repeated employing the catalyst of Example 1. Operating conditions were identical to those defined in Example 2 with the exception that reactor pressure was reduced to 1800 p.s.i.g. The reaction temperature required to effect 50% conversion per pass to 570° F. minus product was determined to be 735° F. Under these conditions the efficiency of conversion to turbine fuel boiling between 300 and 570° F. was determined to be 70.6%.

EXAMPLES 4

Another catalyst of this invention containing nickel and tungsten on a support comprising 2.5 weight-percent zeolite, 10 weight-percent alumina and 87.5 weight-percent silica-magnesia on a dry weight basis was prepared in accordance with the procedures described in Example 1. The final product exhibited a composition corresponding to 4.6 weight-percent NiO and 20.7 weight-percent $WO_3$. This material was sulfided by prolonged contact with a stream of 10% hydrogen sulfide in hydrogen at elevated temperatures to convert the nickel and tungsten oxides to the corresponding sulfides.

EXAMPLES 5

The composition of Example 4 was employed to hydrocrack the feed described in Example 2 at a pressure of 1800 p.s.i.g., a liquid hourly space velocity of 1.5 and a hydrogen addition rate of 10,000 standard cubic feet per barrel of hydrocarbon. It was determined that under these conditions a temperature of 737° F. was required to effect 50% conversion of the feed products boiling below 570° F. Selectivity to turbine fuel was 77.8 percent.

EXAMPLE 6

This example demonstrates the preparation of compositions of this invention employing silica-magnesia in the absence of any added constituents such as fluorides. The combination of zeolite and refractory oxides was prepared, impregnated, calcined and sulfided as described in Example 1. Following calcination, the support extrudates contained 5 weight-percent zeolite, 10 weight-percent alumina and 85 weight-percent silica-magnesia. After impregnation with nickel and tungsten and calcination, the final composition contained 4.5 weight-percent nickel and 22.3 weight-percent tungsten determined as the corresponding oxides.

The sulfided catalyst was then employed to convert the feed described in Example 2 under identical conditions. It was determined that a temperature of 733° F. was required to effect 50% conversion per pass to products boiling below 570° F. At this temperature the selectivity of conversion to turbine fuel products boiling between 300° and 570° F. was 74.9 percent. These conditions compared to a temperature requirement of 728° F. and a selectivity of 71.2 percent exhibited by the composition of Example 1. Accordingly, it can be seen that the results of this invention are achieved when employing silica-magnesia starting materials containing no fluoride.

EXAMPLE 7

This composition was similar to that described in the Example 4 in that the support, prior to impregnation, contained 2.5 weight-percent zeolite, 10 weight-percent alumina and 87.5 percent silica-magnesia. However in this example, as in Example 6, the silica-magnesia starting material contained no fluoride. This composition was prepared in accordance with the procedure described in Example 1 and following impregnation contained 5.1 percent nickel and 21.4 percent tungsten determined as the corresponding oxides.

The activity of this composition for hydrocracking the feed described in Example 2 was evaluated under identical conditions. It was determined that a temperature of 739° F. was required to effect 50% conversion per pass to products boiling below 570° F. Under these conditions selectivity to turbine fuel was 77.6 percent. These results compare to a temperature requirement of 737° F. and a selectivity of 77.8 percent for the composition of Example 4 prepared from silica-magnesia containing about 3 weight-percent fluorine.

EXAMPLE 8

This operation illustrates the preparation and hydrocarbon conversion activity of a catalyst of this invention containing nickel, molybdenum and phosphorus deposited on a combination support comprising 5 weight-percent zeolite, 85 weight-percent silica-magnesia and 10 weight-percent alumina. The extrudates were prepared in accordance with the procedures described in Example 1. They were then impregnated by immersion in a solution of ammonium heptamolybdate, nickel nitrate, hexahydrate and orthophosphoric acid at a pH of about 1.1 in proportions sufficient to introduce into the composition amounts of the hydrogenation components corresponding to about 4 weight-percent NiO and about 16 weight-percent $MoO_3$.

EXAMPLE 9

The composition of Example 8 was employed to hydrocrack the feed described in Example 2 under conditions identical to those described in Example 2. Under these conditions it was determined that a reaction temperature of 742° F. was required to obtain 50% conversion per pass to 570° F. minus products. Selectivity to products boiling between 300° and 570° F. was 72.2 percent. It was further determined that a temperature increase of 21° F. was required to double the conversion rate to turbine fuel.

EXAMPLE 10

A comparison catalyst was prepared by the procedure described in Example 1 with the exception that the ammonium-hydrogen stabilized form of the zeolite, rather than being combined with silica-magnesia as described in Example 1, was admixed with alumina in amounts sufficient to provide a final composition containing 5 weight-percent zeolite and 95 weight-percent alumina on a dry weight basis. Sufficient water was added to the admixture to form an extrudable paste. This material was then extruded and calcined as described in Example 1. The extrudates were then impregnated with nickel and tungsten by the procedures described in Example 1 under conditions sufficient to introduce amounts of these respective components corresponding to 4.2 weight-percent NiO and 20.5 weight-percent $WO_3$ on a total weight basis. The impregnated composition was then dried and calcined and sulfided as previously described.

EXAMPLE 11

The hydrocracking activity and selectivity to turbine fuel exhibited by the composition of Example 10 was evaluated by hydrocracking the feed at the conditions described in Example 2. It was determined that a temperature of 749° F. was required to effect 50% conversion per pass to products boiling below 570° F. Turbine fuel efficiency was determined to be 73.3 percent.

Comparison of these results to those observed in Examples 2 and 5 employing the compositions of this invention readily illustrates the superiority of the catalysts and methods descibed herein. For example, the activity of the catalyst employed in Example 11 was such that a temperature of 749° F. was required to effect 50% conversion per pass to turbine fuel. In contrast, a temperature of only 728° F., 21° F. less was required with the composition of Example 2 under otherwise identical conditions. In view of the fact that a temperature increase of only 21° F. was required in Example 2 to double the conversion rate to turbine fuel, it becomes apparent that the composition and methods involved in that operation were about twice as active as those employed in Example 11. It should also be observed however that the selectivity to turbine fuel in Example 2, 71.2 percent, although being significantly lower than the 73.3 percent observed in Example 11, does not completely discount the effect of the activity comparison already mentioned. This point is further borne out by the results of Example 5 wherein a temperature of only 737° F. was required to effect the same conversion over a second composition of this invention containing only 2.5 percent zeolite at a reduced pressure of 1800 p.s.i.g. That temperature was still significantly below that required to obtain the same results in Example 11. However a much higher selectivity of 77.8 percent to turbine fuels was observed in that case.

EXAMPLE 12

Another comparison composition containing 10 percent zeolite was prepared by the procedures described in Example 10. In this instance the extrudates were prepared from a composition containing 10 weight-percent zeolite and 90 weight-percent of alumina on a dry weight basis. The final composition contained amounts of nickel and tungsten corresponding to 4.8 weight-percent NiO and 26.6 weight-percent $WO_3$ respectively.

EXAMPLE 13

The composition of Example 12 was employed to hydrocrack the gas oil feed described in Example 2 at a pressure of 2000 p.s.i.g., a liquid hourly space velocity of 1.5 and a hydrogen addition rate of 10,000 standard cubic feet per barrel of hydrocarbon feed. The reaction temperature required to effect 50% conversion per pass to 570° F. minus product was determined to be 745° F. Under these conditions the efficiency of conversion to turbine fuel was 71.2 percent.

EXAMPLE 14

Another nickel-tungsten containing composition was prepared in accordance with the procedures described in Example 1 with the following exceptions. The catalyst support rather than the containing zeolite and silica-magnesia contained 10 weight-percent zeolite and 90 weight-percent alumina. This material was extruded, dried, impregnated, activated and sulfided as described in Example 1. The resultant composition contained amounts of nickel and tungsten corresponding to 4.7 weight-percent NiO and 24.6 weight-percent $WO_3$.

EXAMPLE 15

The composition of Example 14 was employed to hydrocrack the feed described in Example 2 in a single pass fixed bed reactor. Reaction conditions included the pressure of 1800 p.s.i.g., liquid hourly space velocity of 1.5 and a hydrogen addition rate of 10,000 standard cubic feet of hydrogen per barrel of hydrocarbon feed. Under these conditions it was determined that a temperature of 742° F. was required to obtain 50% conversion per pass to products boiling below 570° F. At this temperature the efficiency of conversion to turbine fuel was determined to be 63.8 percent. A temperature increase of 20° F. was required to double conversion rate.

EXAMPLE 16

A zeolite prepared in accordance with the procedures described in Example 1 was combined with a sufficient amount of a silica-alumina combination containing 20 weight-percent silica to form an extrudable paste having a composition corresponding to 10 weight-percent of the zeolite on dry weight basis. This material was then extruded, calcined, impregnated, activated and sulfided as described in Example 1. The resultant composition contained amounts of nickel and tungsten corresponding to 4.6 weight-percent NiO and 26.4 weight-percent $WO_3$.

EXAMPLE 17

The composition of Example 16 was employed to hydrocrack the feed described in Example 2 under the conditions described in Example 15. It was determined that under those conditions a temperature of 756° F. was required to effect 50% conversion per pass to 570° F. minus product. Conversion efficiency to turbine fuel was 47.9 percent.

Comparing the results of this example employing the composition of Example 16, with the results of Example 15, indicates that the silica-alumina containing combination of Example 16 was markedly inferior in both activity and selectivity. The significance of the 14° F. temperature differential required to effect 50% conversion is made more significant by comparison of that differential to the temperature differential of 20° F. required to double the conversion rate to 570° F. minus products in Example 15. It seems reasonable to conclude that the composition of Example 14 was at least half again as active as the silica-alumina containing combination of Example 16.

EXAMPLE 18

This procedure illustrates that thermal activation of the aluminosilicate described in Example 1 prior to incorporation with a refractory oxide results in a composition having properties which are substantially distinct from those that occur when the thermal activation is not effected until the aluminosilicate is combined with the same refractory oxide. This composition was prepared by repeatedly exchanging a sodium Y zeolite identical to the sodium Y starting material employed in Example 1, with ammonium sulfate, steaming, and reexchanging with ammonium ion as described in Example 1. However, prior to combination with the refractory oxide, the zeolite was calcined at a temperature of 800° C. for one hour. The final sodium content of this composition was only 0.3 weight-percent. Accordingly, this material was similar in several respects to the "ultra stable" zeolites discussed by Maher et al. in U.S. Pat. 3,293,192, at least insofar as the general methods of preparing those zeolites relate to the composition of this invention.

The resulting zeolite was then combined with sufficient alumina and water to form an extrudable paste containing 20 weight-percent of the zeolite and 80 weight-percent alumina on a dry weight basis. The paste was then extruded and the pellets were calcined at 900° F. for two hours.

Nickel and tungsten were then added to the extrudate pellets by immersing the pellets in a solution of nickel nitrate hexahydrate and ammonium tungstate in proportions sufficient to introduce into the extrudates amounts of the hydrogenation components corresponding to 3.9 weight-percent NiO and 22.3 weight-percent $WO_3$. The impregnated pellets were then calcined at 900° F. for one hour.

EXAMPLE 19

The composition of Example 18 was employed to hydrocrack the feedstock described in Example 2 under identical conditions. It was determined that a temperature of 731° F. was required to effect 50%. conversion per pass to products boiling below 570° F. At this temperature the efficiency of conversion to turbine fuel was 54.9 percent. A temperature increase of 23° F. was required to double the conversion rate to products boiling below 570° F. at these conditions.

I claim:

1. A process for the selective hydrocracking of a mineral oil feedstock containing a substantial proportion of hydrocarbons boiling above 700° F. to a midbarrel product boiling in the range of about 300°–700° F., which comprises contacting said feedstock plus added hydrogen with a hydrocracking catalyst under hydrocracking conditions, said hydrocracking catalyst comprising a Group VIII metal hydrogenating component supported on a zeolitic cracking base, said cracking base comprising a major proportion of silica-magnesia and a minor proportion of a crystalline zeolite selected from the class consisting of zeolites Y, T, L and Omega, said cracking base having been prepared by the steps of:
   (a) subjecting an ammonium-sodium form of said zeolite containing less than about 3 weight-percent sodium to steam treatment at a temperature between about 800° and 1650° F. in the presence of at least about 2 p.s.i. water vapor partial pressure for a time sufficient to convert said zeolite to a stable hydrogen-sodium form;
   (b) reexchanging the resultant stabilized zeolite with ammonium ions to effect a further reduction in sodium content to less than about 2 weight-percent as $Na_2O$;
   (c) admixing said zeolite with said silica-magnesia component; and
   (d) calcining the zeolite-silica-magnesia composite at a temperature of at least about 600° F. for a sufficient time to effect zeolitic deammoniation thereof.

2. A process as defined in claim 1 wherein said feedstock boils predominantly above about 700° F.

3. A process as defined in claim 2 wherein the hydrocracking conditions are adjusted to produce a product boiling predominantly in the turbine fuel range.

4. A process as defined in claim 2 wherein the hydrocracking conditions are adjusted to produce a product boiling predominantly in the diesel fuel range.

5. A process as defined in claim 2 wherein the hydrocracking conditions are adjusted to produce a product boiling predominantly in the furnace oil range.

6. A process as defined in claim 1 wherein said catalyst also contains a Group VIB metal, metal oxide or sulfide.

7. A process as defined in claim 6 wherein said Group VIB metal is tungsten, and said Group VIII metal is nickel.

8. A process as defined in claim 1 wherein the hydrocracking conditions are adjusted to convert at least about 20 volume percent of said feed to product boiling below the initial boiling point of said feed.

9. A process as defined in claim 1 wherein said zeolite is Y zeolite.

10. A process as defined in claim 9 wherein said catalyst contains between about 0.5 and 5 weight-percent of said zeolite.

References Cited

UNITED STATES PATENTS

| | | | |
|---|---|---|---|
| 3,257,310 | 6/1966 | Plank et al. | 208—120 |
| 3,518,051 | 6/1970 | Maher et al. | 423—112 |
| 3,617,483 | 11/1971 | Child et al. | 208—59 |
| 3,507,778 | 4/1970 | Gladrow et al. | 208—111 |
| 3,764,519 | 10/1973 | Meyer | 208—111 |
| 3,781,199 | 12/1973 | Ward | 208—89 |

DELBERT E. GANTZ, Primary Examiner

S. BERGER, Assistant Examiner

U.S. Cl. X.R.

208—Dig. 2; 252—455 Z

UNITED STATES PATENT OFFICE
CERTIFICATE OF CORRECTION

Patent No. 3,838,040　　　　　　　　Dated September 24, 1974

Inventor(s) John W. Ward

It is certified that error appears in the above-identified patent and that said Letters Patent are hereby corrected as shown below:

This Patent is assigned to Union Oil Company of California, Los Angeles, California, a Corporation of California.

Signed and sealed this 10th day of December 1974.

(SEAL)
Attest:

McCOY M. GIBSON JR.　　　　　　　C. MARSHALL DANN
Attesting Officer　　　　　　　　Commissioner of Patents